(12) United States Patent
Fujisawa et al.

(10) Patent No.: US 10,583,865 B2
(45) Date of Patent: Mar. 10, 2020

(54) VEHICLE REAR STRUCTURE

(71) Applicant: HONDA MOTOR CO., LTD., Tokyo (JP)

(72) Inventors: Kota Fujisawa, Wako (JP); Takashi Yamada, Wako (JP); Kanji Kaneko, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/113,011

(22) Filed: Aug. 27, 2018

(65) Prior Publication Data
US 2019/0061830 A1  Feb. 28, 2019

(30) Foreign Application Priority Data

Aug. 29, 2017 (JP) ................. 2017-163830

(51) Int. Cl.
| B62D 25/08 | (2006.01) |
| B62D 21/03 | (2006.01) |
| B62D 25/02 | (2006.01) |
| B62D 25/20 | (2006.01) |
| B62D 21/15 | (2006.01) |
| B62D 21/11 | (2006.01) |
| B60R 16/04 | (2006.01) |

(52) U.S. Cl.
CPC ............ B62D 25/08 (2013.01); B62D 21/03 (2013.01); B62D 21/11 (2013.01); B62D 21/152 (2013.01); B62D 25/025 (2013.01); B62D 25/2027 (2013.01); B60R 16/04 (2013.01)

(58) Field of Classification Search
CPC ........ B62D 25/08; B62D 21/13; B62D 21/11; B62D 21/152; B62D 25/025; B62D 25/2027

USPC ..................... 296/203.04, 187.11
See application file for complete search history.

(56) References Cited

U.S. PATENT DOCUMENTS

| 2005/0046170 A1 | 3/2005 | Uhara et al. | |
| 2008/0252104 A1* | 10/2008 | Yamaguchi | B62D 21/152 296/203.04 |
| 2011/0175401 A1* | 7/2011 | Fujimura | B62D 25/087 296/203.04 |
| 2012/0175897 A1 | 7/2012 | Rawlinson et al. | |

FOREIGN PATENT DOCUMENTS

JP    2016-052862 A    4/2016

OTHER PUBLICATIONS

German Office Action with English translation dated May 16, 2019 (26 pages).

* cited by examiner

Primary Examiner — Joseph D. Pape
(74) Attorney, Agent, or Firm — Rankin, Hill & Clark LLP

(57) ABSTRACT

A vehicle rear structure according to the present invention includes: a rear side frame disposed on each side of the rear portion of a vehicle body; and a rear cross-member coupling the rear side frames to each other. Each of the rear side frames includes a front-rear portion extending in a front-rear direction of the vehicle body and an oblique portion extending obliquely so as to be displaced gradually outward in a vehicle width direction as extending frontward from a front end of the front-rear portion, the oblique portion includes a narrowest portion at which the area of a closed cross-section is smallest, and the rear cross-member couples the narrowest portions to each other.

8 Claims, 5 Drawing Sheets

VEHICLE REAR STRUCTURE

BACKGROUND OF THE INVENTION

1. Field of the Invention

The present invention relates to a vehicle rear structure.

2. Description of the Related Art

In a known conventional vehicle rear structure, the fronts of rear side frames are curved according to the shapes of the rear wheel arches and connected to the rear ends of the side sills (for example, see Patent Literature 1). In this vehicle rear structure, the rear wheels are disposed rearward of the side sills and outward of the rear side frames in the vehicle width direction.

PRIOR ART DOCUMENT(S)

Patent Literature(s)

Patent Literature 1: JP 2016-052862 A

SUMMARY OF THE INVENTION

However, in a conventional vehicle rear structure (for example, see Patent Literature 1), the closer to the floor side (inward in the vehicle width direction) the rear wheel arch is due to design variation of the vehicle type to which this vehicle rear structure is applied, the thinner the rear side frame may be. Accordingly, the rigidity of the rear side frame will be low at the thin portion.

For such a vehicle rear structure, it can be imagined that when a collision load at a rear-end collision of the vehicle is inputted to the rear side frame, the rear side frame can break in the middle. If the rear side frame breaks in the middle, the vehicle rear structure cannot transfer the collision load efficiently from the rear side frame to the side sill. Consequently, the vehicle rear structure cannot absorb the collision energy sufficiently.

An object of the present invention is to provide a vehicle rear structure having more excellent performance in absorbing collision energy than conventional vehicle rear structures regardless of the vehicle type.

A vehicle rear structure to solve the above problem includes: a rear side frame connected to a rear edge of a side sill disposed on each side of a vehicle body; and a rear cross-member coupling the rear side frames to each other. Each of the rear side frames includes a front-rear portion extending in a front-rear direction of the vehicle body and an oblique portion extending obliquely so as to be displaced gradually outward in a vehicle width direction as extending frontward from a front end of the front-rear portion, the oblique portion includes a narrowest portion at which the area of a closed cross-section is smallest, and the rear cross-member couples the narrowest portions to each other.

The present invention provide a vehicle rear structure having more excellent performance in absorbing collision energy than conventional vehicle rear structures regardless of the vehicle type.

DETAILED DESCRIPTION OF THE EMBODIMENTS

Description will be provided in detail for a vehicle rear structure according to an embodiment of the present invention (this embodiment) with reference to the drawings as appropriate.

In the vehicle rear structure in this embodiment, each of oblique portions of rear side frames on both sides of the vehicle body has a narrowest portion, and these narrowest portions are coupled to each other with a rear cross-member.

Hereinafter, the present invention will be described specifically, taking, as an example, a vehicle rear structure used in an electric vehicle, a plug-in hybrid vehicle, or the like which are equipped with a battery for the driving unit. However, the present invention is not limited to this example, but can be applied to various vehicles having a structure in which a pair of rear side frames is coupled to each other with a rear cross-member.

Figure 1:
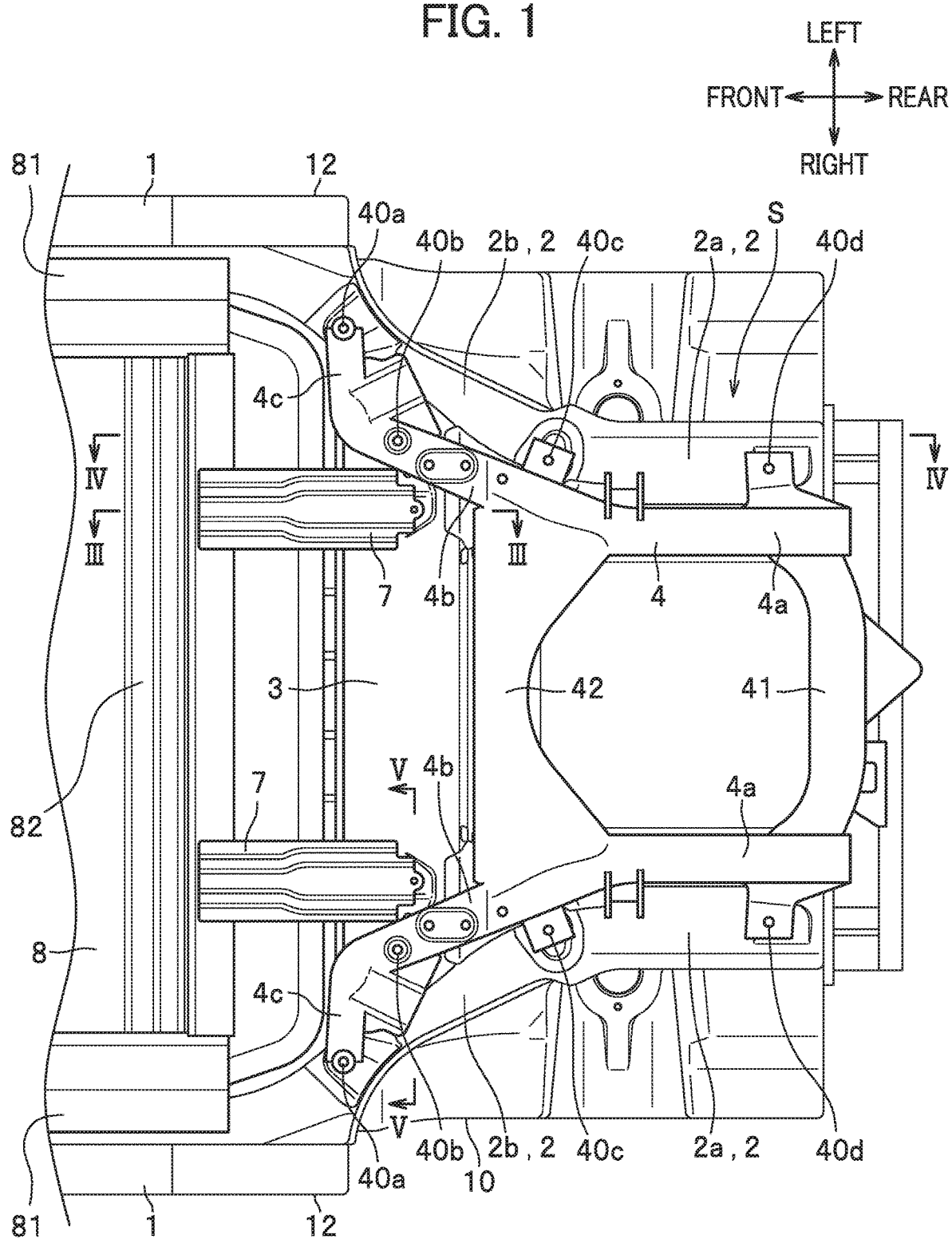
FIG. 1 is a bottom view of the rear portion of a vehicle having a vehicle rear structure according to an embodiment of the present invention.
Figure 2:
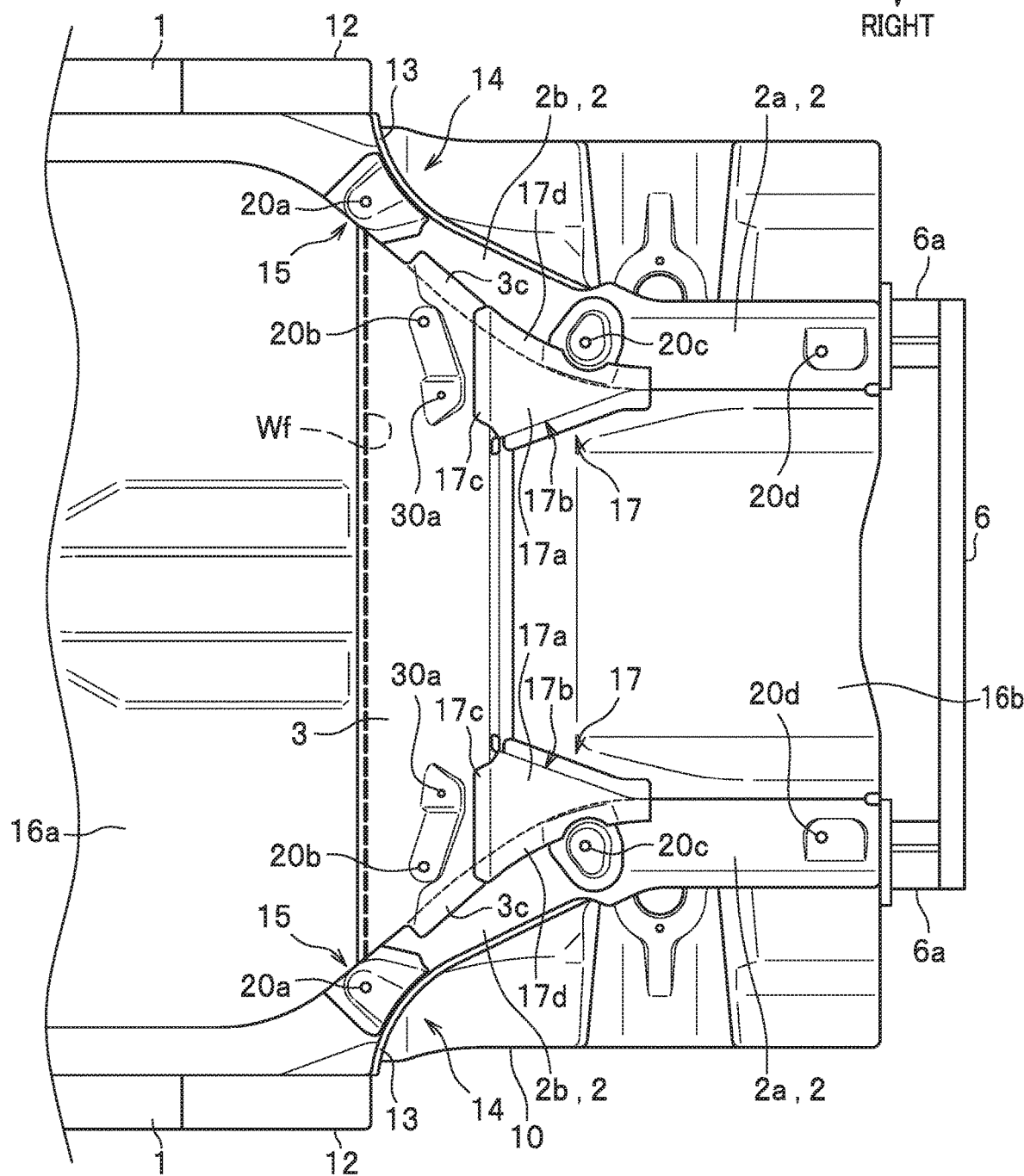
FIG. 2 is a bottom view of the rear portion of the vehicle in which a rear sub frame, battery case, and brackets are omitted from FIG. 1.

FIG. 1 is a bottom view of the rear portion of a vehicle 12 on which a vehicle rear structure S in this embodiment is mounted. FIG. 2 is a bottom view of the rear portion of the vehicle 12 in which a rear sub frame 4, battery case 8, and brackets 7 are omitted from FIG. 1. Up, down, front, rear, right, and left directions in the following description agree with the up, down, front, rear, right, and left directions viewed from a driver seated in the vehicle 12. Note that the right-left direction agrees with the vehicle width direction.

As shown in FIG. 1, the vehicle rear structure S in this embodiment includes side sills 1 extending in the front-rear direction on both sides of a vehicle body 10, rear side frames 2 extending rearward from the rear ends of the side sills 1, a rear cross-member 3 coupling below-mentioned oblique portions 2b of the rear side frames 2 to each other, and the rear sub frame 4 disposed below the rear side frames 2. The vehicle body 10 in this embodiment further includes the battery case 8 and the brackets 7 that make the rear cross-member 3 support this battery case 8.

<Side Sill>

Each side sill 1 is formed by connecting a side sill inner (not shown) and a side sill outer (not shown) disposed respectively on the inner side and the outer side in the vehicle width direction so as to form a hollow space inside, and inside of which a side sill stiffener (not shown) is disposed.

Although not shown, the side sills 1 extend to the vicinity of a dashboard lower at the front of the vehicle body.

<Rear Side Frame>

As shown in FIG. 2, each rear side frame 2 includes mainly a front-rear portion 2a and an oblique portion 2b.

The front-rear portion 2a is disposed rearward of the oblique portion 2b, which will be described next, and inward of the side sill 1 in the vehicle width direction and extends in the front-rear direction. Specifically, the front-rear portion 2a extends substantially in parallel with the axle and substantially horizontally. Note that the front-rear portion 2a in this embodiment extends in the front-rear direction and has a substantially constant width in bottom view.

The front-rear portion 2a has a closed cross-sectional structure in a substantially rectangular shape. To the rear ends of the front-rear portions 2a are connected the front surfaces of both ends of a bumper beam 6 extending in the vehicle width direction, via bumper beam extensions 6a.

The oblique portion 2b is connected to the front end of the front-rear portion 2a and extends obliquely so as to be displaced gradually outward in the vehicle width direction as extending frontward from the front end of the front-rear portion 2a.

Although not shown, the oblique portion 2b in this embodiment has a hat shape in cross-sectional view that opens outward in the vehicle width direction. Upper and lower flanges (not shown) of the oblique portion 2b, corresponding to the brim of the hat shape, are connected to the inner surface of a wheel arch 13 in the vehicle width direction by welding or other methods.

The oblique portion 2b connected to the wheel arch 13 forms a closed cross-section in a substantially rectangular shape in cooperation with the wheel arch 13.

The front end of the oblique portion 2b is disposed inward of the side sill 1 in the vehicle width direction to be overlapped with the rear end of the side sill 1 in the front-rear direction, to which the front end of the oblique portion 2b is connected.

Although the vehicle body 10 in side view is not shown, the oblique portion 2b extends obliquely and gradually upward (toward the back side of the paper surface of FIG. 2) as extending rearward from the connecting portion with the side sill 1, and the rear end of the oblique portion 2b is connected to the front end of the front-rear portion 2a.

At the distal end of the oblique portion 2b in this embodiment is formed a narrow portion 14.

This narrow portion 14 is formed by the oblique portion 2b gradually decreasing in the lateral width (width in the direction orthogonal to the extending direction) as extending from the front-rear portion 2a side toward the side sill 1, and then halfway through it, gradually increasing in the lateral width conversely as extending to the connecting portion with the side sill 1.

The narrow portion 14 is formed by the outer edge of the oblique portion 2b in the vehicle width direction being recessed in an arc shape obliquely forward and inward in the vehicle width direction at a position adjacent to the connecting portion with the side sill 1.

Note that although the narrow portion 14 in this embodiment is set to include a narrowest portion 15 at which the area of the closed cross-section is smallest while the rear side frame 2 extends, the narrow portion 14 only needs to be set to include a narrowest portion 15 at which the area of the closed cross-section is smallest at least while the oblique portion 2b extends. Incidentally, the area of the closed cross-section of the rear side frame 2 in this embodiment is defined as the area of the closed cross-section orthogonal to the extending direction of the rear side frame 2.

This rear side frame 2 has a first mounting portion 20a, third mounting portion 20c, and fourth mounting portion 20d for the rear sub frame 4 (see FIG. 1) described later. These mounting portions 20a, 20c, and 20d will be described later in detail.

In FIG. 2, reference sign 16a indicates a front floor panel, and reference sign 16b indicates a rear floor panel.

<Rear Cross-Member>

As shown in FIG. 2, the rear cross-member 3 extends in the vehicle width direction below the rear floor panel 16b and is attached to the rear side frames 2 so as to bridge the rear side frames 2.

Figure 3:
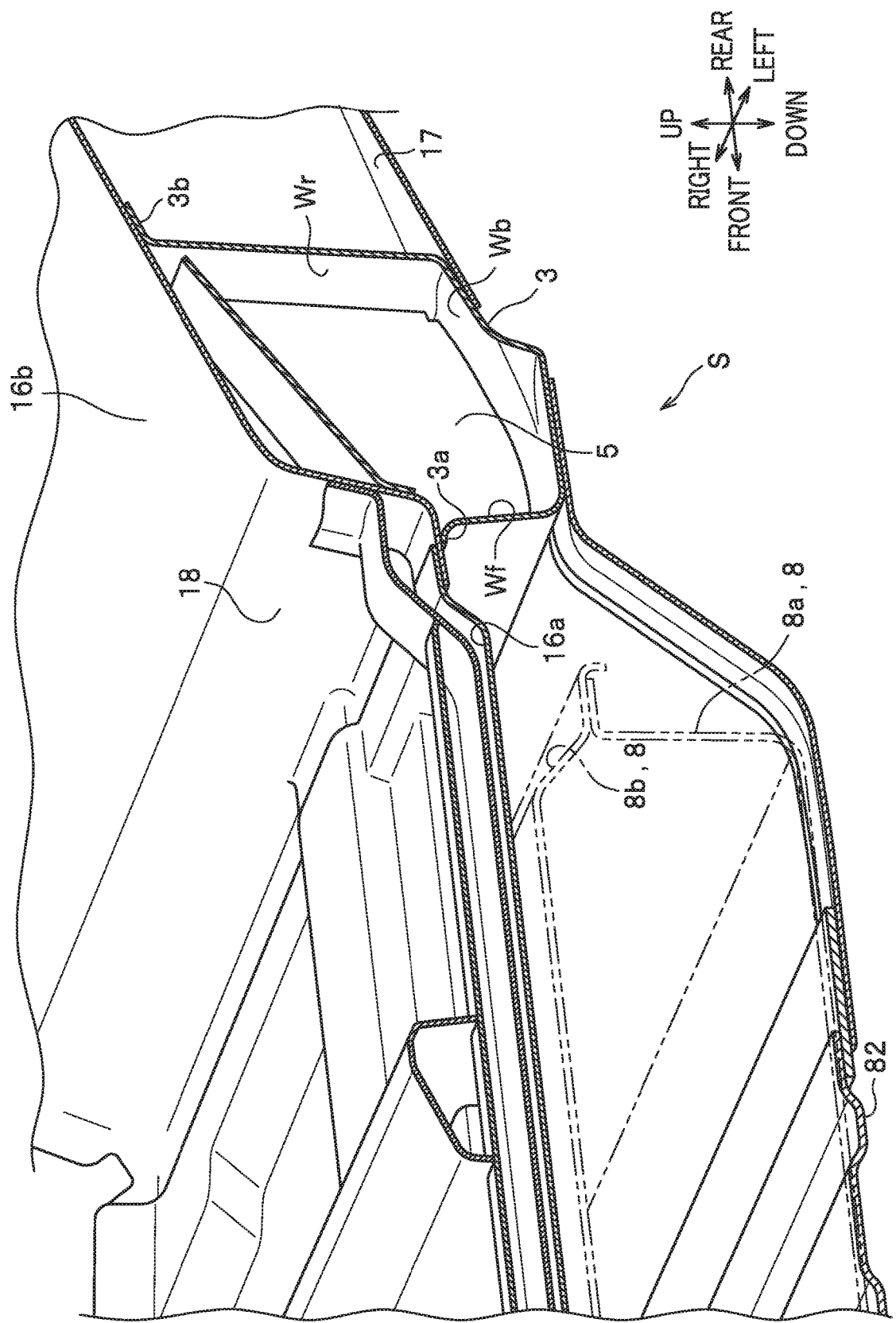
FIG. 3 is a partial perspective view of the vehicle rear structure, including a cross-section taken along the line III-III in FIG. 1.

FIG. 3 is a partial perspective view of the vehicle rear structure S, including a cross-section taken along the line in FIG. 1. Here, in FIG. 3, the rear sub frame 4 (see FIG. 1) is not shown.

As shown in FIG. 3, the rear cross-member 3 has a hat shape in cross-sectional view that opens upward. Specifically, the rear cross-member 3 has a bottom wall Wb, a front wall Wf rising upward from the front edge of the bottom wall Wb, a rear wall Wr rising upward from the rear edge of the bottom wall Wb, and a front flange 3a and a rear flange 3b forming the brim of the hat shape.

The front flange 3a and the rear flange 3b are connected to the lower surface of the rear floor panel 16b by welding or other methods.

Note that the rear floor panel 16b to which the rear cross-member 3 is connected extends rearward via a vertical wall 18 rising upward from a connecting portion with the front floor panel 16a, thus forming a step. The rear cross-member 3 is connected to the rear floor panel 16b so as to straddle the step.

Accordingly, the front wall Wf of the rear cross-member 3 is set shorter than the rear wall Wr in the up-down direction, and the rear wall Wr is set longer than the front wall Wf to absorb the step of the rear floor panel 16b.

The rear cross-member 3 connected to the rear floor panel 16b in this way forms a closed cross-section in a substantially rectangular shape in cooperation with the rear floor panel 16b.

In FIG. 3, reference sign 5 indicates a bulkhead disposed inside the closed cross-section of the rear cross-member 3, reference sign 8 indicates the battery case represented by imaginary lines (dashed double-dotted lines), and reference sign 17 indicates a gusset coupling the rear cross-member 3 and the rear side frame 2 (see FIG. 2). These bulkhead 5, battery case 8, and gusset 17 will be described later in detail.

Returning to FIG. 2, the both ends of the rear cross-member 3 in the vehicle width direction are connected to the oblique portions 2b of the rear side frames 2 by welding or other methods. Specifically, connection flanges 3c formed at both ends of the rear cross-member 3 are connected to the lower surfaces of the rear side frames 2 by welding or other methods.

Here, the rear cross-member 3 in this embodiment couples the narrow portions 14 of the rear side frames 2 to each other. In a further preferred embodiment, the rear cross-member 3 couples the narrowest portions 15 of the rear side frames 2 to each other. In a still further preferred embodiment, the front wall Wf of the rear cross-member 3 is connected to the rear side frames 2 so as to be disposed between the narrowest portions 15 at the oblique portions 2b. In FIG. 2, the dashed line indicated by reference sign Wf shows the position of the front wall Wf of the rear cross-member 3. Incidentally, in this embodiment, it is assumed that the foremost portion of the front wall Wf inclined in the front-rear direction is disposed between the narrowest portions 15. However, the present invention allows a configuration in which the rearmost portion of the front wall Wf is disposed between the narrowest portions 15, or a configuration in which an arbitrary intermediate portion of the front wall Wf in the front-rear direction is disposed between the narrowest portions 15.

This rear cross-member 3 has second mounting portions 20b for the rear sub frame 4 (see FIG. 1) described later and bracket mounting portions 30a for the brackets 7 (see FIG. 1) through which the battery case 8 is supported on the rear cross-member 3. These second mounting portions 20b and the bracket mounting portions 30a will be described later in detail.

<Rear Sub Frame>

Next the rear sub frame 4 (see FIG. 1) will be described.

Figure 4:
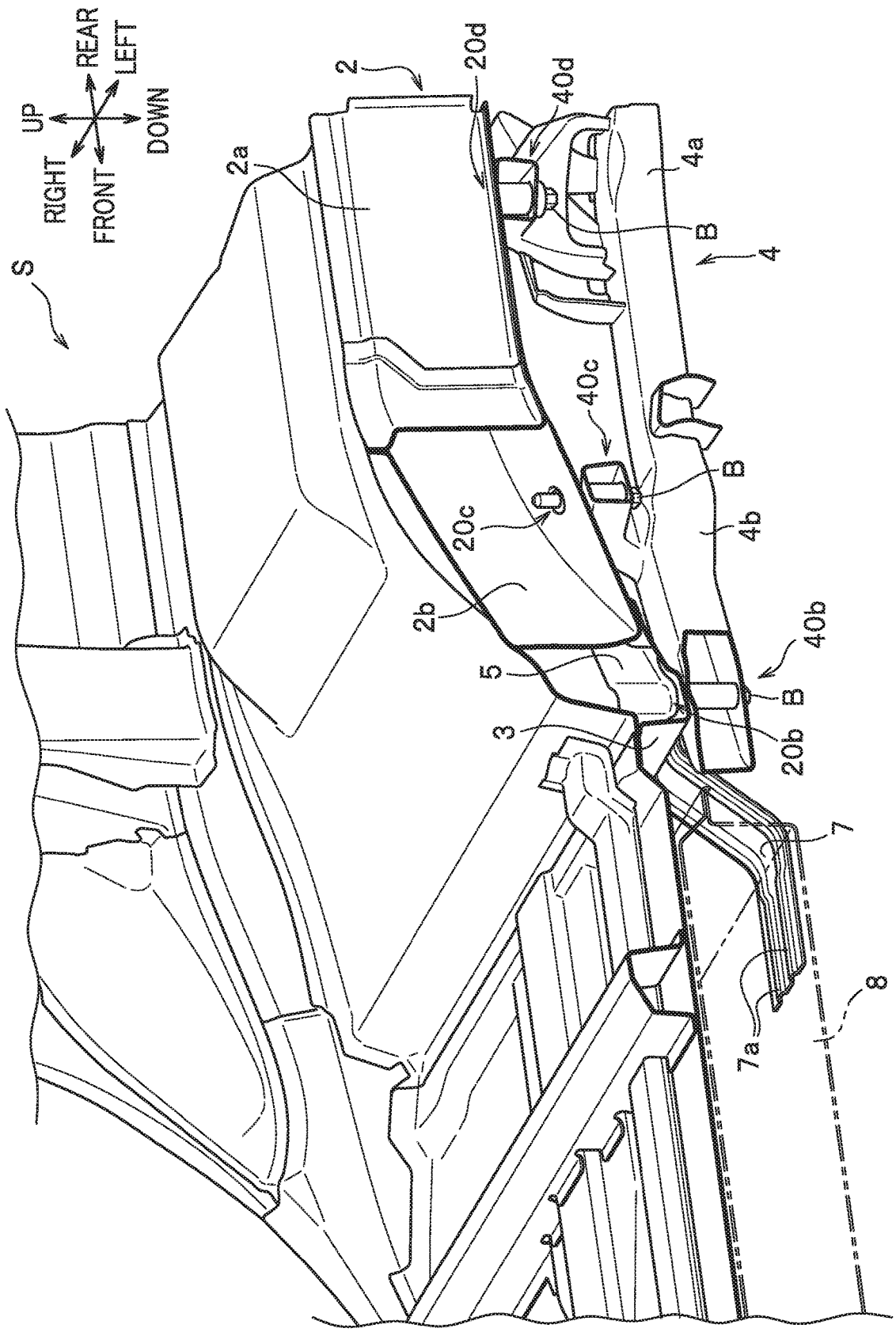
FIG. 4 is a partial perspective view of the vehicle rear structure, including a cross-section taken along the line IV-IV in FIG. 1.

FIG. 4 is a partial perspective view of the vehicle rear structure S including a cross-section taken along the line IV-IV in FIG. 1. Here, in FIG. 4, the battery case 8 is indicated by the imaginary lines (dashed double-dotted lines).

As shown in FIG. 4, the rear sub frame 4 is disposed below the rear side frames 2. On the rear sub frame 4 are mounted the power unit (not shown), the rear suspension unit (not shown), and other parts.

The rear sub frame 4 includes front-rear portions 4a disposed below the front-rear portions 2a of the rear side frames 2 and extending in the front-rear direction, and oblique portions 4b disposed below the oblique portions 2b of the rear side frames 2 and extending in the front-rear direction. The front-rear portions 4a are connected to the rear ends of the oblique portions 4b.

Returning to FIG. 1, in bottom view, the front-rear portions 4a are located inward of the rear side frames 2 and extends in the front-rear direction so as to be substantially in parallel with the front-rear portions 2a. The rear portions of the front-rear portions 4a are coupled to each other with a cross beam 41.

The oblique portions 4b are located inward of the rear side frames 2 and extend substantially in parallel with the oblique portions 2b in bottom view. In other words, each oblique portion 4b extends obliquely so as to be displaced gradually outward in the vehicle width direction as extending forward from the front end of the front-rear portion 4a. The oblique portion 4b extends from the front-rear portion 4a side to the front edge of the rear cross-member 3. The rear portions of the oblique portions 4b are coupled to each other with a cross beam 42.

The rear sub frame 4 further includes extended portions 4c. Each extended portion 4c extends outward in the vehicle width direction from the front edge of the oblique portion 4b along the front edge of the rear cross-member 3. The distal end portion of the extended portion 4c is located at the narrowest portion 15 (see FIG. 2) of the rear side frame 2.

In the distal end portion of the extended portion 4c is formed a first connecting portion 40a at a position corresponding to the first mounting portion 20a (see FIG. 2) formed at the narrowest portion 15.

In the front portion of the oblique portion 4b is formed a second connecting portion 40b at a position corresponding to the second mounting portion 20b (see FIG. 2) of the rear cross-member 3.

In the rear portion of the oblique portion 4b is formed a third connecting portion 40c at a position corresponding to the third mounting portion 20c (see FIG. 2) of the rear side frame 2. Note that as shown in FIG. 2, the third mounting portion 20c is formed at a rear portion of the oblique portion 2b of the rear side frame 2. As shown in FIG. 1, the third connecting portion 40c is formed at a position corresponding to the coupling portion between the rear portion of the oblique portion 4b and the cross beam 42.

As shown in FIG. 1, in the rear portion of the front-rear portion 4a is formed a fourth connecting portion 40d at a position corresponding to the fourth mounting portion 20d (see FIG. 2) of the rear side frame 2. Note that as shown in FIG. 2, the fourth mounting portion 20d is formed at a rear portion of the front-rear portion 2a of the rear side frame 2. As shown in FIG. 1, the fourth connecting portion 40d is formed at a position corresponding to the coupling portion between the rear portion of the front-rear portion 4a and the cross beam 41.

As shown in FIG. 4, the second connecting portion 40b, third connecting portion 40c, and fourth connecting portion 40d of the rear sub frame 4 are attached with bolts B to the second mounting portion 20b of the rear cross-member 3 and the third mounting portion 20c and fourth mounting portion 20d of the rear side frame 2, respectively. Although not shown, the first connecting portions 40a (see FIG. 1) are attached to the first mounting portions 20a (see FIG. 2) via bolts.

Note that in FIG. 4, reference sign 5 indicates the bulkhead to which the second connecting portion 40b is coupled via the bolt B.

<Bulkhead>

Next the bulkhead 5 (see FIG. 4) will be described.

Figure 5:
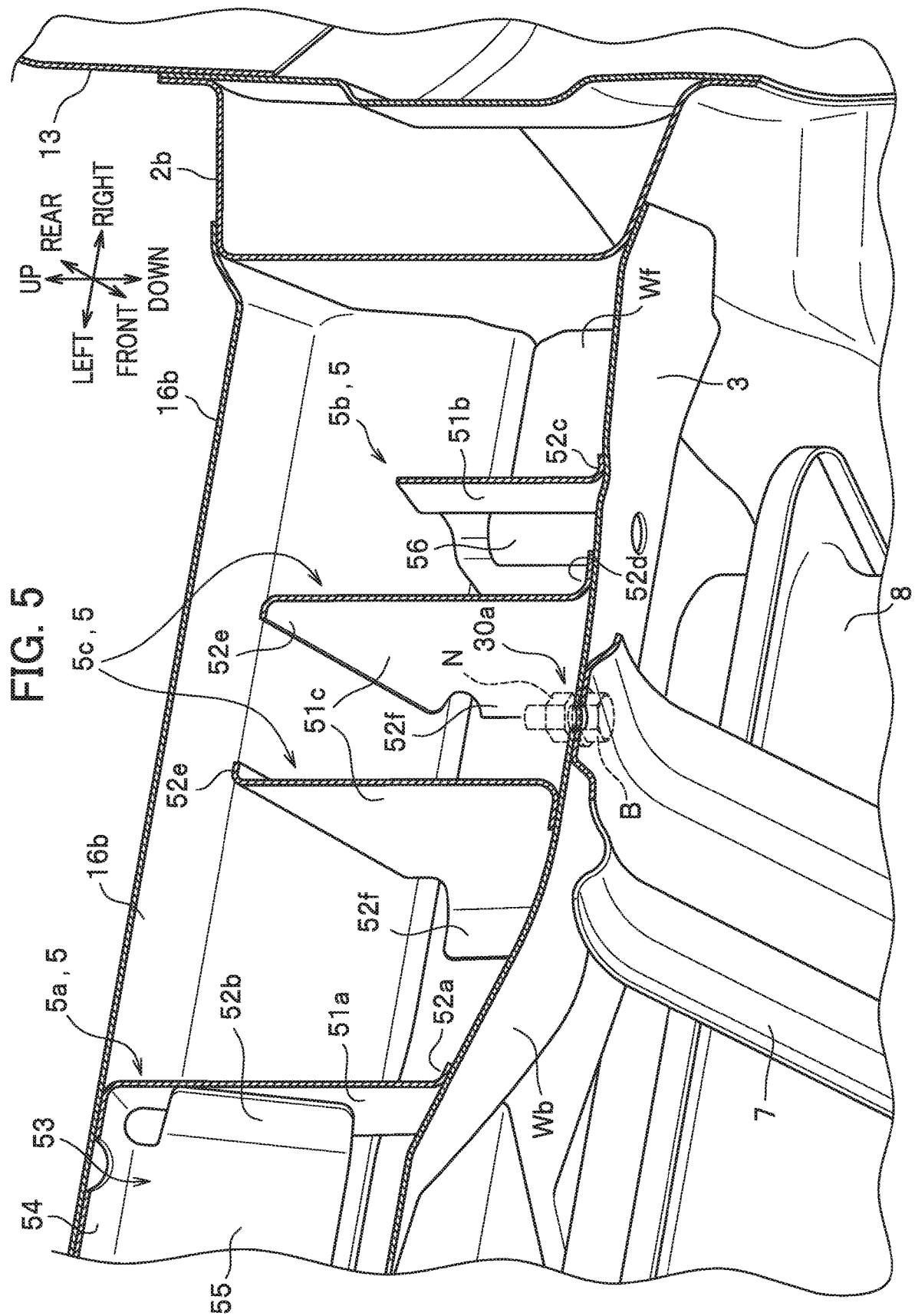
FIG. 5 is a partially enlarged perspective view of a rear cross-member, including a cross-section taken along the line V-V in FIG. 1.

FIG. 5 is a partially enlarged perspective view of the rear cross-member 3 including a cross-section the taken along line V-V in FIG. 1. FIG. 5 shows the bulkhead 5 disposed inside the closed cross-section of the rear cross-member 3 when the rear cross-member 3 is looked up from a position frontward of the vehicle body and obliquely downward. As shown in FIG. 5, the bulkhead 5 is constituted of multiple plates (partition walls) partitioning the inside of the rear cross-member 3 in the direction intersecting the vehicle width direction.

The bulkhead 5 in this embodiment includes a first bulkhead 5a disposed at the center of the rear cross-member 3, a second bulkhead 5b disposed at a position corresponding to the second mounting portion 20b (see FIG. 2), and a pair of third bulkheads 5c disposed between the first bulkhead 5a and the second bulkhead 5b.

Note that the bracket 7 described later is attached to the lower surface of the rear cross-member 3 at a position corresponding to between the pair of third bulkheads 5c, using the bolt B and a plate nut N.

The first bulkhead 5a includes a partition plate 51a, a flange 52a formed along the lower edge of the partition plate 51a, and a stiffener 53 integrally formed with the partition plate 51a.

The flange 52a is connected to the bottom wall Wb of the rear cross-member 3.

The stiffener 53 has a connecting portion 54 connecting the partition plate 51a to the lower surface of the rear floor panel 16b, a reinforcement plate 55 integrally formed with this connecting portion 54 and descending from this connecting portion 54, and a flange 52b connecting this reinforcement plate 55 to the plate surface of the partition plate 51a. Although not shown, the partition plate 51a of the first bulkhead 5a has a flange connected to the rear wall Wr (see FIG. 3) of the rear cross-member 3.

The second bulkhead 5b includes a partition plate 51b, a flange 52c formed along the lower edge of the partition plate 51b, and a collar 56 connected to the partition plate 51b. Inside the collar 56 is disposed a nut (not shown) into which the bolt B (see FIG. 4) at the second connecting portion 40b (see FIG. 4) is fastened. Although not shown, the partition plate 51b of the second bulkhead 5b has flanges connected to the front wall Wf and the rear wall Wr (see FIG. 3) of the rear cross-member 3, respectively.

Each third bulkhead 5c includes a partition plate 51c, a flange 52d formed along the lower edge of the partition plate 51c, a flange 52e formed along the upper edge of the partition plate 51c, and a flange 52f formed along the front edge of the partition plate 51c.

The flange 52d is connected to the bottom wall Wb of the rear cross-member 3.

The flange 52e is connected to the lower surface of the rear floor panel 16b.

The flange 52f is connected to the front wall Wf of the rear cross-member 3.

Although not shown, the partition plate 51c of the third bulkhead 5c has a flange connected to the rear wall Wr (see FIG. 3) of the rear cross-member 3.

Note that in FIG. 5, reference sign 7 indicates the bracket, through which the battery case 8 is supported on the rear cross-member 3. Reference sign 30a indicates the bracket mounting portion of the rear cross-member 3. Reference sign B indicates the bolt for attaching the bracket 7 to the bracket mounting portion 30a, and reference sign N indicates the plate nut which is engaged with the bolt B by the thread. Reference sign 2b indicates the oblique portion of the rear side frame 2, and the reference sign 13 indicates the wheel arch.

<Battery Case>

Next the battery case 8 (see FIG. 1) will be described.

As shown in FIG. 1, the battery case 8 is disposed forward of the rear cross-member 3. Although not shown, the battery case 8 has a substantially rectangular shape in bottom view of the vehicle body 10.

This battery case 8 extends forward between the side sills 1, and the front end of the battery case 8 is supported by a battery mounting frame (not shown) extending in the vehicle width direction along the rear edge of the dashboard lower (not shown).

As shown in FIG. 1, on both sides of the battery case 8 in the vehicle width direction are disposed a pair of support plates 81. Although FIG. 1 shows only the rear ends of these support plates 81, the support plates 81 extend alongside of the side sills 1 to the front ends of the side sills 1.

These support plates 81 are fixed to the side sills 1 with the outer edges thereof in the vehicle width direction connected to the lower surfaces of the side sill inners (not shown) described earlier.

The left and right support plates 81 are bridged by a frame member 82. Although FIG. 1 shows only one frame member 82 disposed at a rear portion of the support plates 81, multiple frame members 82 are disposed at certain intervals in the front-rear direction of the support plates 81.

As shown in FIG. 3, the battery case 8 is disposed below the front floor panel 16a, being supported on the frame members 82. Note that the battery case 8 is fastened to the frame members 82 with bolts (not shown) disposed at appropriate positions on the frame members 82.

Incidentally, this battery case 8 in this embodiment includes a tray 8a that houses a battery pack (not shown) formed of a lithium ion battery or the like and a lid 8b closing the upper opening of the tray 8a.

As shown in FIG. 1, the battery case 8 is supported by the rear cross-member 3 via the pair of brackets 7. Specifically, the front portions of the brackets 7 are connected to the lower surface of the frame member 82 and the lower surface of the battery case 8 by welding or other methods, and the rear portions of the brackets 7 are fastened to the bracket mounting portions 30a (see FIG. 2) of the rear cross-member 3. Incidentally, in this embodiment, the bolt B and the plate nut N are used to connect each bracket 7 and the rear cross-member 3 as shown in FIG. 5.

As shown in FIG. 4, the bracket 7 in this embodiment is a plate bent in a step shape to be adapted to the step between the lower surface of the battery case 8 and the lower surface of the rear cross-member 3. Note that this bracket 7 has multiple beads 7a formed to extend in the front-rear direction.

<Gusset>

As shown in FIG. 2, the gussets 17 are members each of which has a substantially triangular shape in bottom view and is disposed at the corner formed by the rear side frame 2 and the rear cross-member 3.

Each gusset 17 is a bent plate having an L-shaped cross-section, formed by a triangular plate member 17a disposed substantially on the same plane as the lower surfaces of the rear side frame 2 and the rear cross-member 3 and a leg plate member 17b bent toward the rear floor panel 16b on the opposite side from the corner formed by the oblique portion 2b and the rear cross-member 3.

The triangular plate member 17a of the gusset 17 has an edge 17c extending in the vehicle width direction in a range including the second mounting portion 20b for the rear sub frame 4 and the bracket mounting portion 30a.

The triangular plate member 17a of the gusset 17 also has an edge 17d extending from the oblique portion 2b to the front portion of the front-rear portion 2a of the rear side frame 2. In other words, the third mounting portion 20c of the rear side frame 2 for the rear sub frame 4 is disposed at the coupling portion between the gusset 17 and the rear side frame 2.

<Operational Effect>

Next, description will be provided for the operational effects achieved by the vehicle rear structure S in this embodiment.

In the vehicle rear structure S in this embodiment, the rear cross-member 3 couples the narrowest portions 15 of the rear side frames 2 to each other as shown in FIG. 1.

In this vehicle rear structure S, when a collision load is inputted to rear side frames 2, the narrowest portions 15 generate component forces directed inward in the vehicle width direction, but the rear cross-member 3 reduces deformation of the rear side frames 2 at the narrowest portions 15, caused by these components.

It means that the vehicle 12 having the vehicle rear structure S reduces the deformation of the rear side frames 2 at the narrowest portions 15, caused by the collision load, regardless of the width of the narrowest portion 15 varied by the design of the vehicle type. Consequently, the vehicle rear structure S transfers efficiently the collision load to the rear portion of the vehicle body 10 via the rear side frames 2 and thus further improves performance of absorbing the collision energy.

In addition, in the vehicle rear structure S in this embodiment, the front wall Wf of the rear cross-member 3 is disposed between the narrowest portions 15 of the oblique portions 2b as shown in FIG. 2.

In this vehicle rear structure S, the narrowest portions 15 are supported by the front wall Wf of the rear cross-member 3 located therebetween, which reduces deformation of the rear side frames 2 more positively.

Note that the rear wall Wr of the rear cross-member 3 may also be disposed between the narrowest portions 15 of the rear side frames 2, as described later.

In the vehicle rear structure S in this embodiment, the narrowest portion 15 of the rear side frame 2 has the first mounting portion 20a for the rear sub frame 4 as shown in FIG. 2.

In this vehicle rear structure S, the rigidity of the narrowest portion 15 is increased by the rear sub frame 4. Thus, this vehicle rear structure S reduces deformation of the rear side frames 2 more positively.

In addition, in the vehicle rear structure S in this embodiment, the rear cross-member 3 has the second mounting portions 20b for the rear sub frame 4 as shown in FIG. 2.

In this vehicle rear structure S, the rear sub frame 4 couples the narrowest portions 15 and the rear cross-member 3, which reduces deformation of the rear side frames 2 more positively.

In the vehicle rear structure S in this embodiment, the rear cross-member 3 has the second mounting portions 20b and the bracket mounting portions 30a disposed to be adjacent to each other as shown in FIG. 2.

This vehicle rear structure S increases the mounting rigidity of the brackets 7 and thus transfers the collision load to the battery case 8 via the brackets 7 more positively. This further improves the performance of absorbing collision energy in the vehicle rear structure S.

In the vehicle rear structure S in this embodiment, the rear sub frame 4 is attached to the bulkheads 5 via the second mounting portions 20b as shown in FIG. 4.

In this vehicle rear structure S, the bulkheads 5 increase the rigidity of both the bracket mounting portions 30a and the second mounting portions 20b formed on the rear cross-member 3.

In the vehicle rear structure S in this embodiment, the gussets 17 each are coupled to the rear cross-member 3 in a range including the second mounting portion 20b and the bracket mounting portion 30a in the vehicle width direction as shown in FIG. 2.

This vehicle rear structure S transfers the collision load inputted to the rear side frames 2, from the front-rear portions 2a to the battery case 8 via the gussets 17 and the brackets 7. This further improves the performance of absorbing collision energy in the vehicle rear structure S.

In this vehicle rear structure S, the gussets 17 each are coupled to the rear cross-member 3 in a certain range including the second mounting portion 20b, and this reduces local deformation in the rear cross-member 3 caused by the collision load inputted via the gussets 17. This makes it possible for the vehicle rear structure S to transfer the collision load to the battery case 8 via the gussets 17 and the brackets 7. This further improves the performance of absorbing collision energy in the vehicle rear structure S.

In the vehicle rear structure S in this embodiment, the third mounting portion 20c for the rear sub frame 4 is formed on the rear side frame 2 so as to be adjacent to the coupling portion with the gusset 17, formed in the front-rear portion 2a, as shown in FIG. 2.

In this vehicle rear structure S, the third mounting portions 20c of the rear side frames 2 and the second mounting portions 20b of the rear cross-member 3 are coupled by the rear sub frame 4. This reduces compressive deformation in the gussets 17 each disposed between the rear side frame 2 and the rear cross-member 3, caused by the collision load from the rear side frames 2. This makes it possible for the vehicle rear structure S to transfer the collision load to the battery case 8 via the gussets 17 and the brackets 7. This further improves the performance of absorbing collision energy in the vehicle rear structure S.

The embodiment of the present invention has been described above; however, the present information is not limited to the above embodiment and can be implemented in various forms.

In the embodiment above, description has been provided for the configuration in which the front wall Wf of the rear cross-member 3 is disposed between the narrowest portions 15 of the oblique portions 2b as shown in FIG. 2. However, the present invention may have a configuration, although not shown, in which the rear wall Wr of the rear cross-member 3 is disposed between the narrowest portions 15 of the oblique portions 2b. In this vehicle rear structure S, the narrowest portions 15 can be supported by the rear wall Wr of the rear cross-member 3 located therebetween, and this reduces deformation of the rear side frames 2 more positively.

In the embodiment described above, description has been provided for the configuration in which the narrowest portions 15 are formed to be recessed in an arc shape obliquely forward and inward in the vehicle width direction as shown in FIG. 2. However, the narrowest portions 15 in the present invention can be formed to be recessed in a polygonal shape.

What is claimed is:

1. A vehicle rear structure comprising:
a rear side frame connected to a rear edge of a side sill disposed on each side of a vehicle body; and
a rear cross-member coupling the rear side frames to each other, wherein
each of the rear side frames includes a front-rear portion extending in a front-rear direction of the vehicle body and an oblique portion extending obliquely so as to gradually extend outward in a vehicle width direction and frontward in the front-rear direction of the vehicle body from a front end of the front-rear portion,
the front-rear portion and the oblique portion define a closed cross section, and the oblique portion includes a narrowest portion at which an area of the closed cross-section is smallest, and
the rear cross-member couples the narrowest portions to each other.

2. The vehicle rear structure according to claim 1, wherein the rear cross-member includes a front wall rising upward from a front edge of a bottom wall of the rear cross-member and a rear wall rising upward from a rear edge of the bottom wall, and
the front wall or the rear wall is disposed between the narrowest portions.

3. The vehicle rear structure according to claim 1, wherein the narrowest portion has a first mounting portion for a rear sub frame disposed below the rear side frames.

4. The vehicle rear structure according to claim 3, wherein the rear cross-member has a second mounting portion for the rear sub frame.

5. The vehicle rear structure according to claim 4, wherein a battery case is disposed forward of the rear cross-member,
the rear cross-member has a bracket mounting portion for a bracket through which the battery case is supported on the rear cross-member, and
the second mounting portion and the bracket mounting portion are adjacent to each other.

6. The vehicle rear structure according to claim 5, wherein a bulkhead is disposed inside the rear cross-member, and the rear sub frame is attached to the bulkhead via the second mounting portion.

7. The vehicle rear structure according to claim 5, further comprising
a gusset coupling the front-rear portion and the rear cross-member, wherein the gusset is coupled to the rear cross-member in a range including the second mounting portion and the bracket mounting portion in the vehicle width direction.

8. The vehicle rear structure according to claim 7, wherein each of the rear side frames has a third mounting portion for the rear sub frame, the third mounting portion being adjacent to a coupling portion with the gusset, the coupling portion being formed on the front-rear portion.

\* \* \* \* \*